Oct. 13, 1931.   J. H. L. PATTERSON   1,826,951
RACK FOR DISHWASHERS
Filed April 4, 1929   3 Sheets-Sheet 1

Oct. 13, 1931.   J. H. L. PATTERSON   1,826,951
RACK FOR DISHWASHERS
Filed April 4, 1929   3 Sheets-Sheet 2
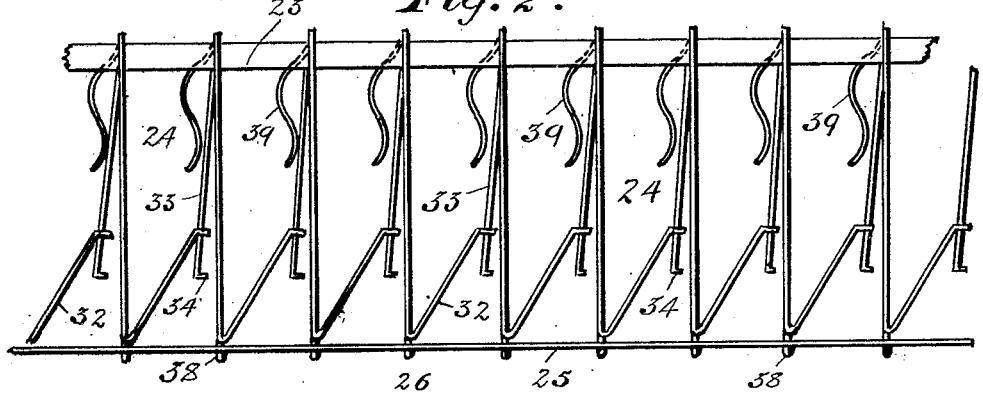
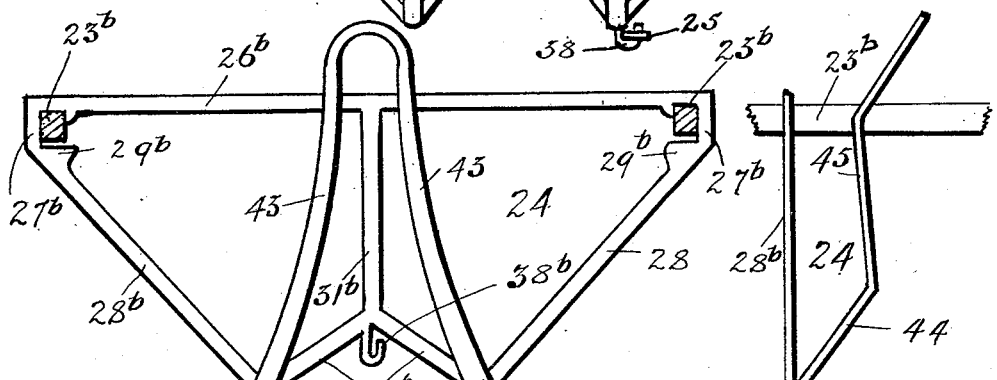

Oct. 13, 1931.   J. H. L. PATTERSON   1,826,951
RACK FOR DISHWASHERS
Filed April 4, 1929   3 Sheets-Sheet 3

Patented Oct. 13, 1931

1,826,951

UNITED STATES PATENT OFFICE

JOHN HENRY LEGGE PATTERSON, OF TORONTO, ONTARIO, CANADA

RACK FOR DISHWASHERS

Application filed April 4, 1929. Serial No. 352,546.

The object of this invention is to devise a rack which may be used with any type of dish washer, which will securely hold the dishes and prevent them coming into contact with each other, and to so construct and assemble the dish holding members of the rack that they can be oscillated for alternately presenting the faces and backs of the dishes to the water streams, this rack comprising a plurality of individual or separate dish holders oscillatably suspended from a supporting structure and collectively coupled together for unitedly shifting the positions, or changing the angles of their respective contents relatively to the vertical axis of the rack.

For an understanding of the invention, reference is to be had to the following description and to the accompanying drawings in which:

Fig. 2 is an enlarged fragmentary side elevation of the rack shown in Fig. 1.

Fig. 3 is an end view of the rack shown in Fig. 2.

Figs. 7 and 8 are respectively fragmentary end and side elevational views of further modifications of the dish holder.

Like characters of reference refer to like parts throughout the specification and drawings.

Figure 1:
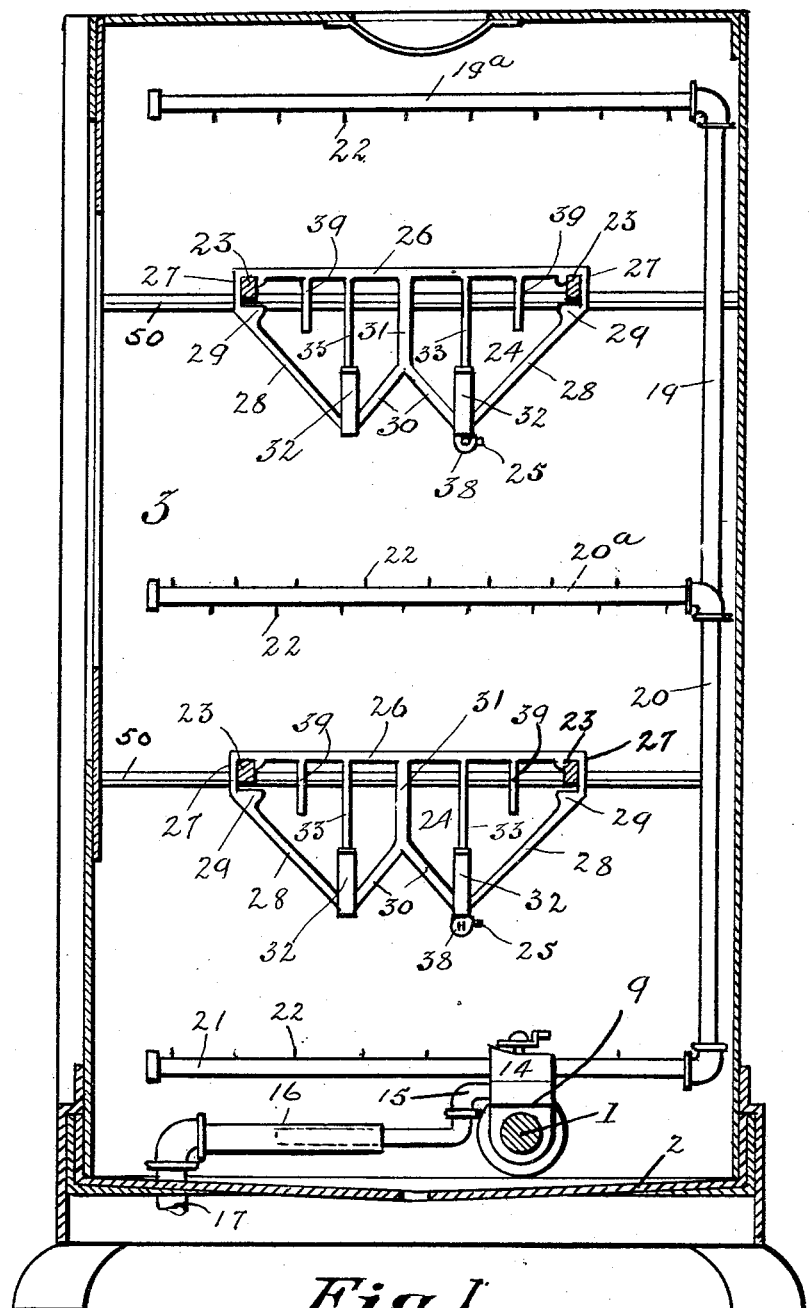
Fig. 1 is a transverse section of a dish washer showing a rack constructed according to this invention.

The rack may be used with any type of dish washer in which water streams are directed against its contents, and for explanatory purposes, it is shown and described as forming part of a dish washer in which the water is discharged from distributing pipes which travel back and forth within the cabinet.

To effect the travel, a shaft 1 is journalled at or near the bottom 2 of the cabinet 3 and provided with right and left hand screw-threads and stopping shoulders at the ends of the screw-threads. A carriage 9 is axially movable on the shaft and a water chest 14 is mounted on the carriage. The water chest 14 has an inlet 15 connected by an extensible flexible pipe 16 with the water main 17, and is fitted with three pipes 19, 20 and 21. The pipe 21 extends horizontally from the water chest and is located near the bottom of the cabinet; the pipe 19 extends vertically from the water chest to approximately the top of the cabinet, and has a horizontal distributing pipe 19a at or near its upper end; and the pipe 20 extends vertically from the water chest and has a horizontal distributing pipe 20a intermediate the pipe 21 and the horizontal pipe 19a. The pipes 19a, 20a, and 21 are each provided with outlets 22 which may be fitted with sprayers or other discharging devices for directing the water streams on the contents of the cabinet and, as they travel back and forth with the water chest and carriage, continually change the position, but not the angle, of the discharge for ensuring the spread of the water over the entire surface of the contents of the racks. For an understanding of the specific construction, arrangement, operation and function of the water chest 14 and pipes 19, 19a, 20, 20a and 21, reference is made to the drawings and specification of Letters Patent of the United States of America No. 1,720,332, granted July 9, 1929, to James Joseph Kehoe in which these parts are shown and described in detail.

In Fig. 1, two of the racks are shown, one located between the horizontal pipes, 19a, 20a, and the other between the pipes 20a, 21, the water streams from these pipes being respectively directed downwards and upwards against their contents.

Each rack, comprises two parallel side bars 23, which may be either fixedly or removably mounted in the cabinet, a plurality of dish holders 24 oscillatably suspended from the side bars; and a shift rod 25 connected to the dish holders for collectively swinging them alternately to the opposite limits of their oscillations and unitedly changing the angle of the contents of the rack relatively to the water streams.

In Figs. 1, 2 and 3 each dish holder consists of a horizontal member 26, seated on and extending slightly beyond the side bars 23; two vertical members 27 at the extremities of the horizontal member 26 extending downwardly below the bottom of the side bars and engaging their outer surfaces for preventing the lateral movement of the dish holder transversely of the rack; two converging members 28 extending downwardly from the vertical members having inwardly projecting or horizontal heels 29 at their junction with the vertical members for engaging the bottom of the side bars 23 and limiting the oscillating movements of the dish holder, a member 30 connecting the lower ends of the converging members 28 for resisting inward and outward strains; a vertical member 31 connecting the member 30 with the horizontal member 26 for sustaining the weight of the contents and retaining the smaller size dishes in the dish holder; and two dish supporting members 32, inclined upwardly-forwardly from the lower extremities of the converging members 28, one on each side of the vertical axis of the holder, forming a seat with two bearing surfaces for a dish and providing two feet upon which the rack stands when removed from the cabinet.

Connected to the horizontal member 26, at each side of the vertical member 31, in the modifications shown in Figs. 1 to 3 inclusive, is a downwardly extending prong or arm 33, and at the free ends of the dish supporting members 32 are eyes 35 through which the prongs or arms 33 of the next adjacent rack are entered for coupling the dish holders together in series, and forming the dish holding receptacles or pockets in which the dishes are placed.

When the parts of the rack are assembled, the dish holders are coupled together and oscillated by the shift rod 25 for collectively changing the position of the contents and alternately presenting the faces and backs of the dishes to the direct action of the water streams.

The shift rod 25, shown in the drawings, consists of a bar, which extends from end to end of the rack and beyond the cabinet for its manual operation and is coupled to the dish holders by the connecting members 38, each of which may be an integral part of the member 30.

Depending from the horizontal member 26 of the dish holder shown in Figs. 1, 2 and 3, are two curved arms or pressure members 39, the bend or bow of which projects, in rear of the horizontal member, for a relatively considerable distance, into the space between the dish holder of which they are part and the dish holder immediately in rear of it for exerting pressure on the dish and preventing its movement independently of its respective holder.

Figure 5:
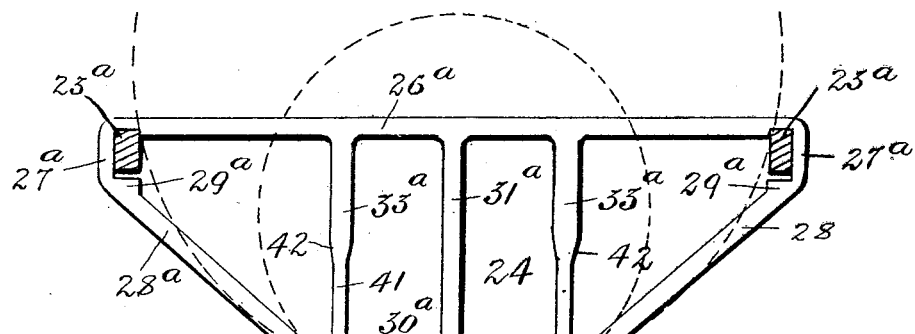
Fig. 5 is an elevational view of the blank from which the holder, shown in Fig. 4 is formed.
Figure 4:
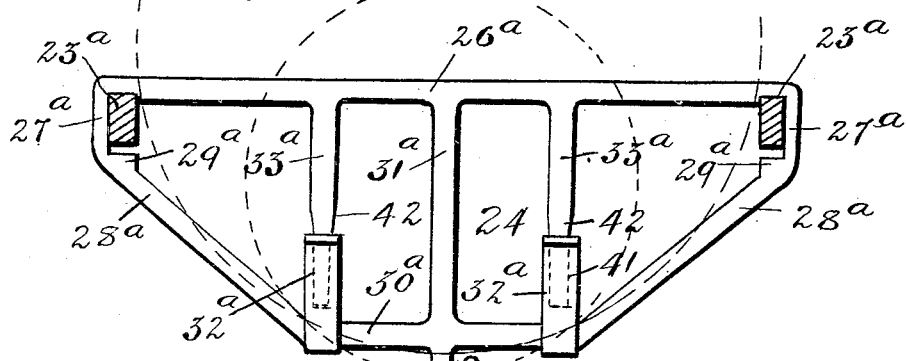
Fig. 4 is an end elevational view of a rack showing a modification of the dish holder.
Figure 6:
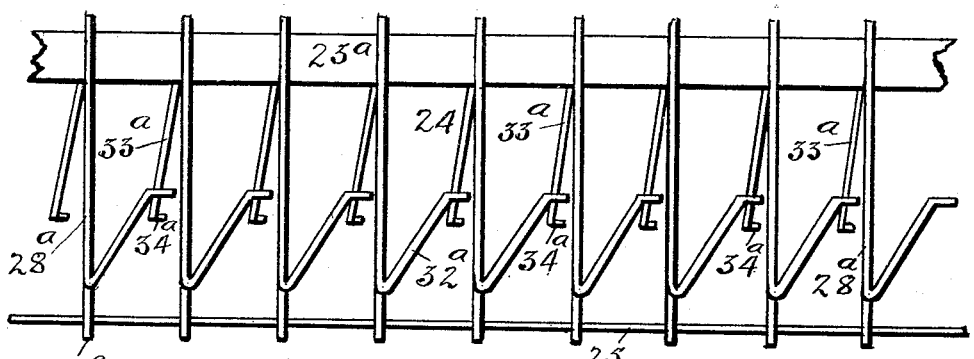
Fig. 6 is a fragmentary side elevational view of a rack comprising the dish holders shown in Fig. 4.

In Figs. 1, 2 and 3, each prong or arm 33 is formed at its free end with an out turned lug or stop 34 for preventing the dish supporting member becoming separated from the prong or arm. In Figs. 4, 5 and 6, the dish holder is oscillatably suspended from a supporting structure 23a and its general construction is similar to that shown in Figs. 1, 2 and 3, except that the arms 39 of the latter construction are dispensed with. The dish holder shown in Figs. 4, 5 and 6, may be described as comprising a horizontal member 26a, vertical members 27a, converging members 28a, horizontal heels 29a, a cross member 30a, a vertical member 31a, supporting members 32a and a connecting member 38a. Each prong or arm 33a is narrowed from approximately the middle to its free end, the narrow part 41 being of corresponding cross sectional dimensions to the eye 35a through which it is entered. At the junction of the narrow part 41 with the wide part of the arm is a shoulder 42 for limiting the movement of the eye 35a in an upward direction, the movement in a downward direction being limited by a lug or stop 34a similar to that shown in Fig. 2.

In Figs. 7 and 8, the dish holder is suspended from a supporting structure 23b and comprises the same horizontal member 26b, vertical members 27b, converging members 28b, horizontal heels 29b, cross member 30b, vertical member 31b, and connecting member 38b as in the previously described constructions, but the receptacle or pocket for the dish is formed by a forked member 43 connected to the lower extremities of the converging members, this forked member being shaped to provide a seat 44 with two bearing surfaces for the dish, and a pressure part 45 bent inwardly towards the horizontal member 26 for retaining the dish securely in position in the holder.

The rack may be a fixed part of the dish washer or it may be removably mounted in it, and in either case the dishes are set in the receptacles so that the face and back of each dish is substantially parallel to the vertical axis of the rack. When the dish holders are in their normal upright position the pressure members force the dishes against the horizontal members, and hold them against movement lengthwise of the rack, and prevent them coming into contact with and damaging each other, the movement of the dishes sidewise of the rack being prevented by the side bars 23.

In Fig. 1, the rack is shown to be removably seated on rails 50 in the dish washer so that it can be taken out of the cabinet, the lower extremities of the converging members 28 then serving as feet and supporting the rack in an upright position.

Various other modifications of the dish holders are within the scope of the invention and they may be made from wire, castings or sheet-metal stampings.

Having thus fully described my invention, what I claim as new and desire to secure by Letters Patent is:

1. A rack for a dish washer comprising a supporting structure, and a plurality of individual dish holders oscillatably suspended from the supporting structure, each dish holder having a receptacle for containing a dish and a pressure member extending towards an adjacent dish holder for engaging the dish in said adjacent holder and preventing the movement thereof in a direction lengthwise of the rack independently of the holder.

2. A rack for a dish washer comprising a supporting structure, a plurality of individual dish holders oscillatably suspended from the supporting structure, and means for coupling the dish holders together and collectively moving them for unitedly shifting the position of their contents, each dish holder having a receptacle for containing a dish, and a pressure member extending towards an adjacent dish holder for engaging the dish in said adjacent holder and preventing the movement thereof in a direction lengthwise of the rack independently of the holder.

3. A rack for a dish washer comprising two parallel side bars, and a plurality of individual dish holders oscillatably suspended from the side bars, each dish holder having a receptacle for containing a dish and a pressure member extending towards an adjacent dish holder for engaging the dish in said adjacent holder and preventing the movement thereof in a direction lengthwise of the rack independently of the holder.

4. A rack for a dish washer comprising two parallel side bars, and a plurality of individual dish holders oscillatably suspended from the side bars, each dish holder having a receptacle for containing a dish and a pressure member extending towards an adjacent dish holder for engaging the dish in said adjacent holder and preventing the movement thereof in a direction lengthwise of the rack independently of the holder, and means forming part of the dish holders for engaging the parallel side bars and limiting the oscillations of said holders.

5. A rack for a dish washer as claimed in claim 3, having a shift rod for coupling the dish holders together and unitedly swinging them alternately to the opposite limits of their oscillations.

6. A rack for a dish washer comprising two side bars, a plurality of individual dish holders, oscillatably supported by the side bars, each of which includes a horizontal member, two downwardly extending members connected with the horizontal member, dish supporting members connected with the downwardly extending members, and a pressure member for engaging the contents of the adjacent dish holder and preventing the movement thereof in a direction lengthwise of the rack independently of the oscillations of the holders.

7. A rack for a dish washer comprising two side bars, a plurality of individual dish holders oscillatably suspended from the side bars, each of which consists of a horizontal member, two vertical members at the extremities of the horizontal member, two converging members extending downwardly from the vertical members, and a supporting member inclined upwardly-forwardly from the lower extremities of the converging members.

8. A rack for a dish washer comprising two side bars, a plurality of individual dish holders oscillatably suspended from the side bars, each of which consists of a horizontal member, two vertical members at the extremities of the horizontal member, two converging members extending downwardly from the vertical members, a supporting member inclined upwardly-forwardly from the lower extremities of the converging members forming a seat for a dish, and a pressure member depending from the horizontal member, for engaging the dish in the adjacent holder and preventing its movement lengthwise of the rack independently of the oscillations of the holders.

9. A rack for a dish washer as claimed in claim 7 having the upper extremity of each dish supporting member formed with an eye, and depending members connected with the horizontal member and entered through the eyes of the dish supporting members of the adjacent holder.

10. A rack for a dish washer as claimed in claim 7 having an inwardly projecting horizontal heel formed at the junction of the vertical and converging members for engaging the bottom of the side bars.

11. A rack for a dish washer as claimed in claim 7 having means connecting the lower extremities of the converging members with the horizontal member for bracing said converging members.

12. A rack for a dish washer as claimed in claim 7 having a transverse member connecting and bracing the lower extremities of the converging members and a vertical member connecting the transverse member with the horizontal member.

13. A rack for a dish washer as claimed in claim 7 having a shift rod coupling the dish holders together for collectively swinging them alternately to the opposite limits of their oscillations.

JOHN HENRY LEGGE PATTERSON.